US006480120B1

(12) United States Patent
Meunier (10) Patent No.: US 6,480,120 B1
(45) Date of Patent: Nov. 12, 2002

(54) AIRBORNE TERRAIN COLLISION PREVENTION DEVICE WITH PREDICTION OF TURNS

(75) Inventor: Hugues Meunier, Les Essarts le Rol (FR)

(73) Assignee: Dassault Electronique, Saint Cloud (FR)

( * ) Notice: Subject to any disclaimer, the term of this patent is extended or adjusted under 35 U.S.C. 154(b) by 657 days.

(21) Appl. No.: 08/843,288

(22) Filed: Apr. 14, 1997

(30) Foreign Application Priority Data

Apr. 15, 1996 (FR) ............................................. 96 04678

(51) Int. Cl.$^7$ ............................................. G08B 23/00
(52) U.S. Cl. ........................... 340/970; 340/961; 701/9; 701/14; 701/301
(58) Field of Search ................................. 340/961, 970, 340/963; 701/301, 4, 8, 9, 3, 14, 17, 18; 342/65

(56) References Cited

U.S. PATENT DOCUMENTS

| 4,567,483 A | * | 1/1986 | Bateman et al. ............ 340/970 |
| 4,684,948 A | * | 8/1987 | Bateman .................... 340/970 |
| 4,914,436 A | * | 4/1990 | Bateman et al. ............ 340/970 |
| 5,414,631 A | * | 5/1995 | Denoize et al. ............. 340/963 |
| 5,488,563 A | * | 1/1996 | Chazelle et al. ........... 340/970 |
| 5,677,842 A | * | 10/1997 | Denoize et al. ............. 340/970 |

FOREIGN PATENT DOCUMENTS

| DE | 4304561 | * | 8/1994 | |
| EP | A 0453327 | | 10/1991 | |
| EP | A0565399 | | 10/1993 | |
| GB | 2266286 | * | 10/1993 | |
| WO | WO A 85/03566 | | 8/1985 | |
| WO | WO A 92/21077 | | 11/1992 | |

OTHER PUBLICATIONS

"A New Approach to CFIT Prevention: GCAS Ground Collision Avoidance System", 11–95, Dassault Electronique, pp. 1–11.*

* cited by examiner

Primary Examiner—Brent A. Swarthout
(74) Attorney, Agent, or Firm—Nixon & Vanderhye P.C.

(57) ABSTRACT

A working memory contains a local altimetric map defining an altitude envelope of the terrain in the vicinity of the aircraft. A vertical limit path of the aircraft is established, on the basis of status indications and selected flight parameters, in the vertical surface containing the axis of its path. A first comparison is undertaken between this vertical limit path and the corresponding part of the altitude envelope, so as to determine a hazard of a vertical collision with the ground, and an alarm can be established according to the result of this first comparison. A lateral limit path of the aircraft on one side of the vertical of the flight path is also established on the basis of the status indications and selected parameters. A second comparison is made between this lateral limit path and the corresponding part of the altitude envelope. The alarm means are arranged to modify at least one of the alarm statuses relating to the first comparison, if the second comparison means do not indicate a hazard of a collision with the ground. The same is done on the other side with another lateral limit path.

20 Claims, 10 Drawing Sheets

AIRBORNE TERRAIN COLLISION PREVENTION DEVICE WITH PREDICTION OF TURNS

FIELD OF THE INVENTION

The invention concerns the general field of air navigation and air safety aids.

PRIOR ART

In EP-A-O 565 399, Applicant has proposed a device comprising:

- an input for receiving status indications, capable of permitting a prediction of the path of the aircraft,
- a working memory capable of containing a temporary local map from which an altitude envelope of the terrain can be defined in the zone where the aircraft is manoeuvring,
- first path prediction means so as to establish a vertical limit path of the aircraft (in the vertical "plane"), on the basis of the said status indications and selected flight parameters.
- first comparison means for effecting a first comparison between this vertical limit path and the corresponding part of the altitude envelope so as to determine a collision hazard with the ground, and
- alarm means to establish at least one alarm status according to the result of the first comparison.

This solution has undeniable advantages, in that it provides an anti-collision device that is entirely on board and is above all capable of taking into account future situations of the aircraft.

However, it has been shown that certain locations, in particular the approaches of certain airports, have a topology that is of the kind which always produces an alarm even within the standard approach manoeuvres. Although it is conceivable to admit such cases by way of exception, this type of exception is pernicious: indeed an alarm system should, as a matter of principle, always intervene deliberately; otherwise one runs the risk that an alarm will be ignored at the time when it should, on the contrary, be imperatively taken into account.

This problem, known for a long time, has never been completely resolved in the known anti-collision systems.

OBJECT OF THE INVENTION

The present invention aims to offer a solution on the basis of the above mentioned device described in EP-A-0 565 399.

SUMMARY OF THE INVENTION

According to the invention, the present invention, there is provided a device for aiding air navigation and air safety, of the type comprising:

- an input for receiving status indications, capable of permitting a prediction of the path of the aircraft;
- a working memory capable of containing a local altimetric map from which an altitude envelope of the terrain can be defined in the vicinity of the aircraft;
- first path prediction means so as to establish a vertical limit path of the aircraft, on the basis of said status indications and selected flight parameters, in the vertical surface containing the axis of its path;
- first comparison means for effecting a first comparison between this vertical limit path and the corresponding part of the altitude envelope, so as to determine a hazard of a vertical collision with the ground; and
- alarm means to establish at least one alarm status according to the result of the first comparison;
- second prediction means for establishing, on the basis of said status indications and selected flight parameters, a lateral limit path for the aircraft on one side of the vertical of the flight path; and
- second comparison means for effecting a second comparison between this lateral limit path and the corresponding part of the altitude envelope;
- wherein the alarm means (5) are arranged so as to modify at least one of the alarm statuses relating to the first comparison, if the second comparison means do not indicate any collision hazard with the ground.

Although such a device, operating only on one side of the vertical of the flight path, already provides progress, it is considered to be preferable to operate on both sides of the vertical. For this purpose, the device is completed by:

- third prediction means so as to establish on the basis of said status indications and selected flight parameters another lateral limit path for the aircraft on the other side of the vertical, and
- third comparison means so as to effect a third comparison between this other lateral limit path and the corresponding part of the altitude envelope,
- and wherein the alarm means are arranged so as to inhibit the alarm status relating to the first comparison which indicates the maximum hazard, at least in the case where both the second and the third comparison means do not at the same time indicate any lateral collision hazard with the ground.

BRIEF DESCRIPTION OF THE DRAWINGS

Other objects and advantages of the invention will become apparent on examining the following detailed description with reference to the attached drawings wherein.

DETAILED DESCRIPTION OF THE PREFERRED EMBODIMENT

The attached drawings are in essence of a definitive nature and therefore form an integral part of the present description.

They may serve, not only to make the description more readily understood but also, if required, to contribute to the definition of the invention.

Moreover, taking into account the technical nature of the subject matter the descriptive content of EP-A-0 565 399 is to be considered as integrally incorporated in the present description. The same applies to the following document:

A memorandum drawn up by DASSAULT ELECTRONIQUE and ROCKWELL AVIONICS—Collins entitled "A New Approach to CFIT Prevention: GCAS GROUND COLLISION AVOIDANCE SYSTEM", publicly available from June, 1995.

The detailed description given below concerns the case of civilian aircraft, subject to the observation that the invention can apply to other categories of aircraft.

Figure 3:
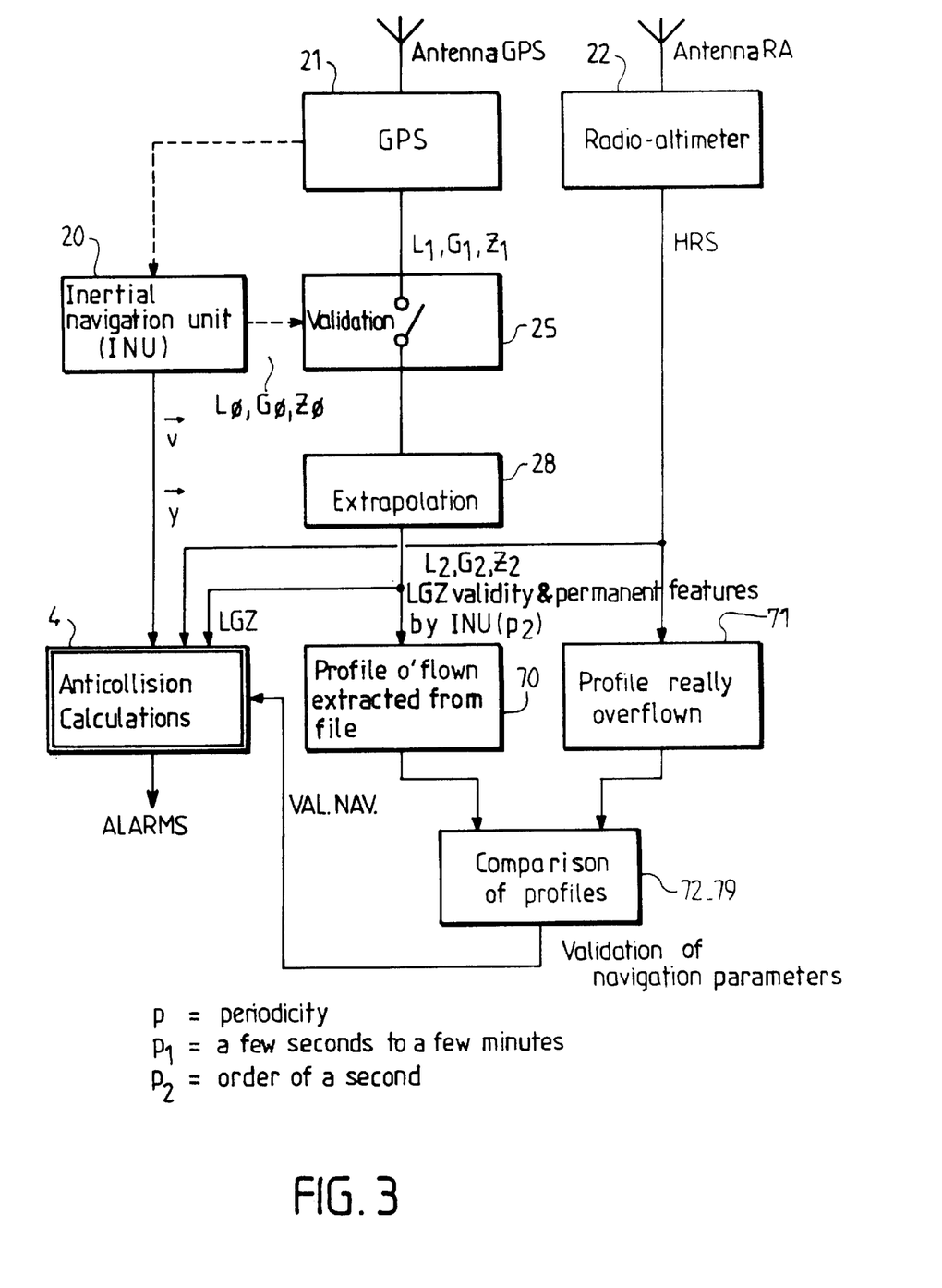
FIG. 3 is an even more detailed, but partial, flow chart of the same prior art device.

Reference is made to FIGS. 1 to 4B. The device described in EP-A-0 565 399 is mainly intended to be installed on board an aircraft. This has means 2 capable of providing indications, in the form of electric signals, of the flight parameters (FIG. 3), such as:

an inertial navigation unit or INU 20 a radio-navigation instrument, here a GPS receiver 21, with its antenna, a radio-altimeter 22 with its antenna, or other on-board navigation sensors.

The inertial navigation unit 20 provides components of the vectors of velocity (V) and of acceleration (GAMMA) of the aircraft. One may deduce therefrom the associated characteristic angles: incidence, sideslip, inclination, pitch, heading, bank in particular. However, inasmuch as the inertial navigation unit measures and/or uses some of these angles for determining the velocity and acceleration vectors, it is preferable to collect the values for the angles directly from the inertial navigation unit when they are used for operating the invention. These angular values may be displayed and/or used at the control unit.

For the altitude, the inertial navigation unit cooperates in the known way with a barometric altimeter (not shown).

The following notations will be defined $Z_b$ is the barometric altitude given by the measurement of the atmospheric pressure, and varies according to the altitude and the meterological conditions, $Z_i$ is the inertial altitude $Z_i$ calculated by the double integration of the vertical acceleration measured by the accelerometers of the inertial navigation unit (long term variations), $Z_{bi}$ is the baro-inertial altitude, that is to say $Z_b$ filtered by $Z_i$ (a loop of the third order, for example), $Z_c$ will be the calculated altitude ((HRS+$Z_{ta}$) where HRS is the radiosonde altitude given by the at least one altimeter of the aircraft (accuracy within a few meters), and $Z_{ta}$ will be the altitude of the terrain beneath the aircraft given by the terrain file (defined below), $Z_{gps}$ is the altitude provided by the GPS.

For most of the time, aircraft are provided with a set of inertial navigation units and with a decision logic, taking into account the whole set of indications from these units. For operating the invention, these data may come from one or several units (to the extent that they are confirmed).

The radio-navigation instrument 21 provides rough measurements of the latitude L1, longitude G1 and altitude Z1 (=$Z_{gps}$) updated at a rate p1 of every few seconds to every few minutes. By integration of the velocity and acceleration vectors, the inertial navigation unit 20 provides other measurements of the latitude LO, longitude GO and altitude ZO (=$Z_{bi}$) which appear precise but are subject to error accumulating over long periods of integration. A block 25 compares these two types of measurements and validates the values L1, G1, Z1 if they are consistent with LO, GO, ZO. Such validation techniques are known. The validated measurements L2, G2, Z2 are available at the rate p1. But they are refined by means of the inertial navigation unit at a rate p2 of approximately once per second.

A block 28 extrapolates the data between the last instant of measurement by the instrument 21 and the present time (this extrapolation is useful, in particular in the case of a problem with the time sequence at which the data are provided, which may be too low).

The radio-altimeter 22 delivers the height above ground, designated HRS.

Figure 4A:
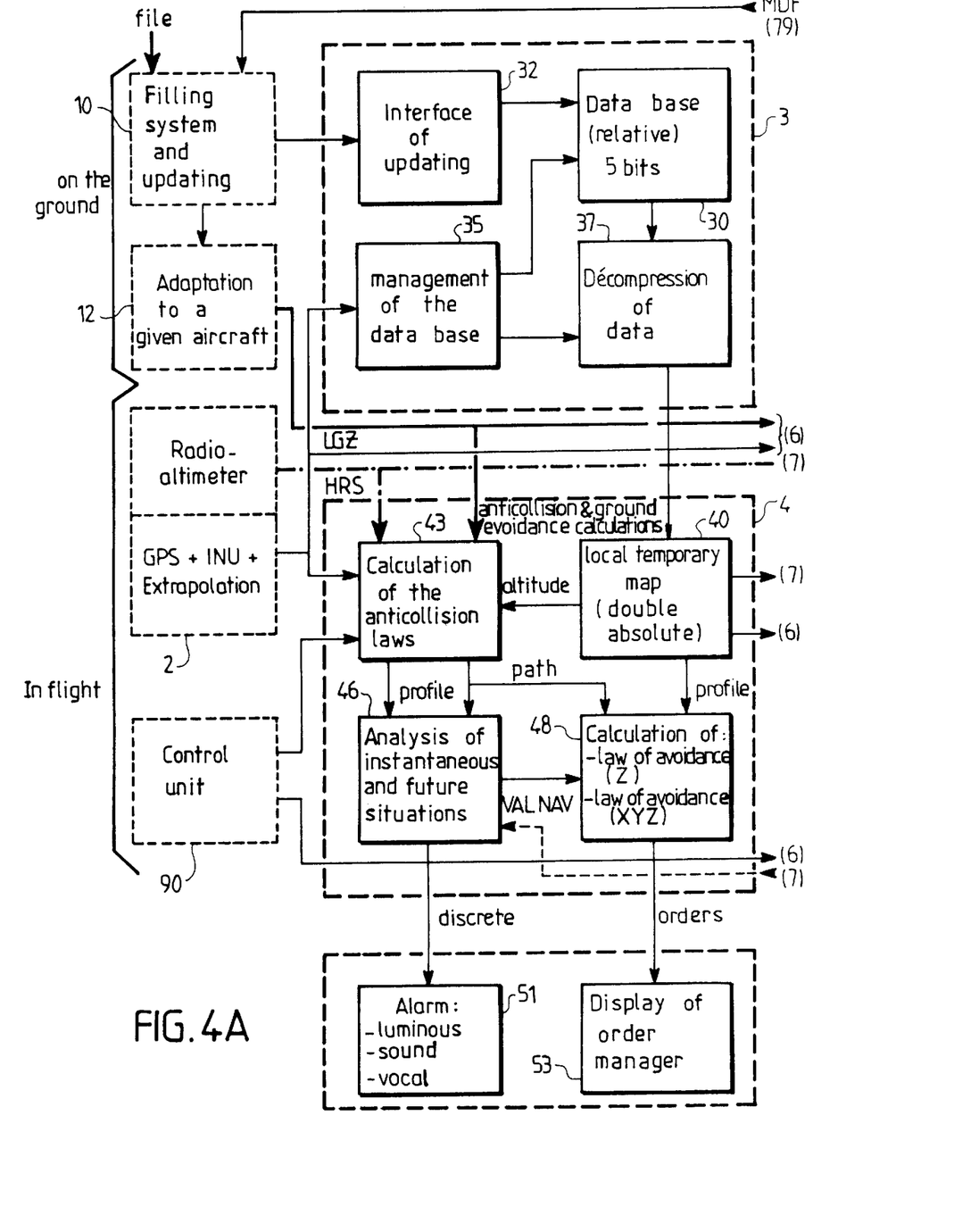
FIGS. 4a and 4b are two other detailed flow charts, which (taking their overlap into account) define in combination one particular embodiment of the same prior art device.

A block 3 contains a terrain file, established in a way that will be described below. Depending on the values L and G, access is gained to a part of this file, termed a local map, and stored in a local memory 40 (FIG. 4A).

On the basis of this local map and the values L, G, Z as well as HRS, the block 4 carries out anti-collision calculations, preferably accompanied by terrain avoidance calculations.

In the presence of a collision hazard, an alarm 51 is emitted. An order manager 53 is capable of suggesting an avoidance manoeuvre. This is destined for the control unit.

The local map can also be used for generating a synthetic image (60) with its visualization device 55.

It will also serve for functions (7) for validating the navigation and for storing deviation (or difference) data, designated MDF.

These deviations are transferred to the ground from the block 79 to the block 10, then they are sifted and serve for a complete or partial updating of the data base 30.

The memory 70 keeps the mapped profile flown over, according to the sequence of the data L, G, Z. The memory 71 keeps the real profile flown over, derived from the height HRS. The deviation between these two profiles is calculated at 72.

Figure 4B:
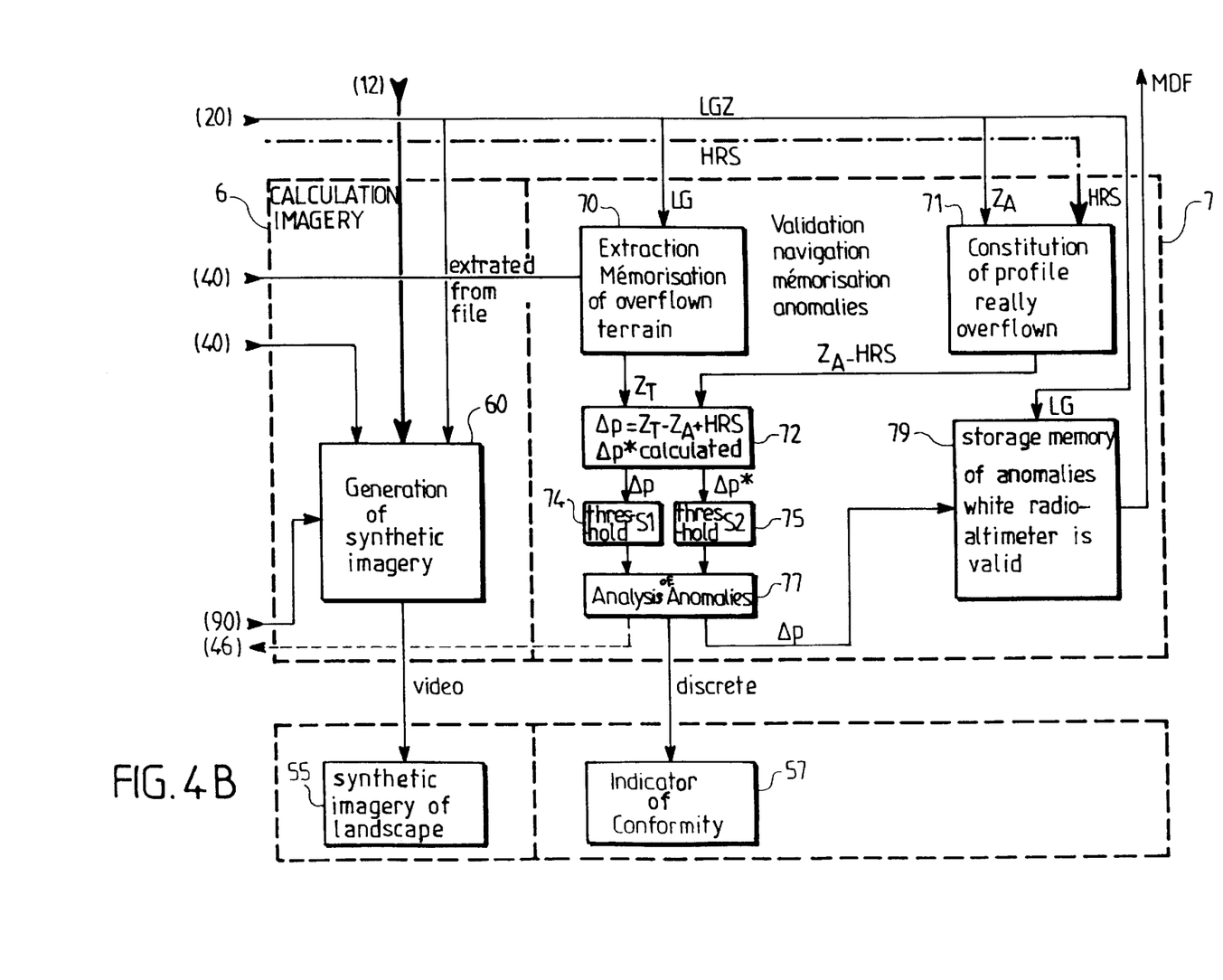

More precisely (FIG. 4B), the deviation is compared at two thresholds 74 and 75 respectively. It is subsequently analysed (77) whence one obtains:

the actuation of a conformity indicator 57 confirming the proper functioning of the device;

the generation of a signal VAL.NAV., for validating the calculations of block 4; and according to other criteria, the storing of data MDF in a memory 79, in accordance with the values L and G in respect of which they have appeared. These data MDF may then, after the flight, serve as the basis for the updating effected in the system 10 of FIG. 4A.

In practice, the analysis block 77 will effect a correlation of the two inputs, but taking into account:

the history (the recent past) of the flight, the estimated confidence in the data of the radio altimeter (operating limits, taking into account the attitude of the aircraft, automatic control), the transient nature of the crossing of the threshold, the analysis of the result (bias, noise or other), optionally, adequate stored data.

For its part, the block 35 for managing the data base uses at least one index which may be stored in the mass memory 30 so as to permit the identification of, and fast access to, the data contained in the data base BDT.

The control unit 90 also provides data which comprise an "input status word" indicating at least:

whether the piloting is automatic or manual; and the characteristics (in particular the flight characteristics) of the aircraft.

One of the essential bases of EP-A-0 565 399 is the fact that the Applicant has perceived the possibility of storing, on board an aircraft, a terrain file which is capable of representing virtually the whole of the land block within the limit of the contour and of resolution suitable for the requirements of an aircraft.

The analysis of the instantaneous and predicted situation of the aircraft can be summed up in a set of curve tests, capable of generating two types of alarms:

a pre-alarm or ("alert") indicating a dangerous configuration in the medium term and an alarm indicating a configuration requiring immediate action by the pilot because the safety of the flight is put in jeopardy.

Figure 5:
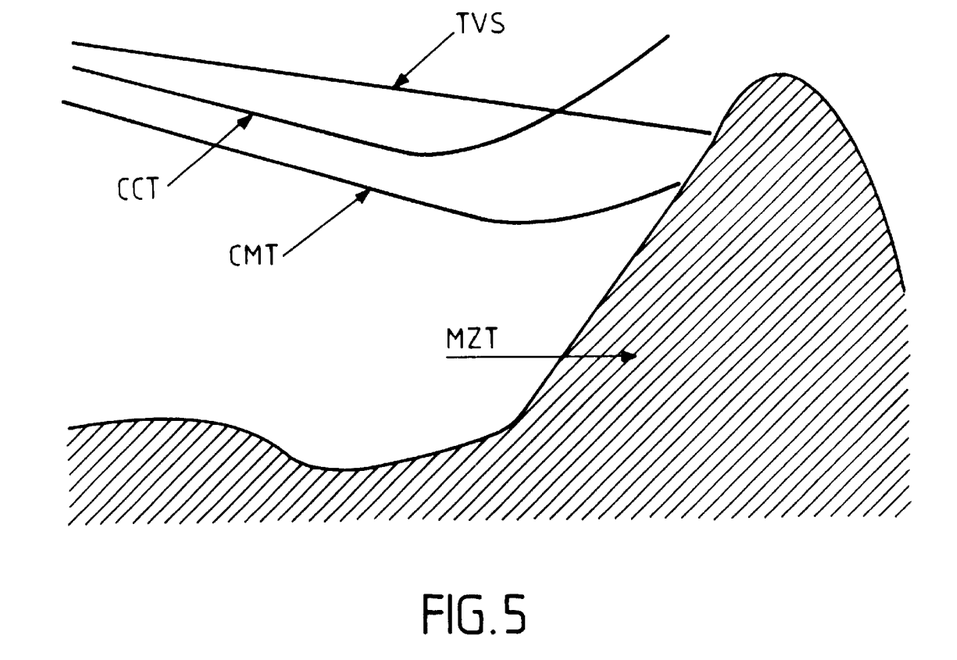
FIG. 5 (FIG. 18 of EP-A-0 565 399) illustrates an example of the known anti-collision protection curve.
Figure 6:
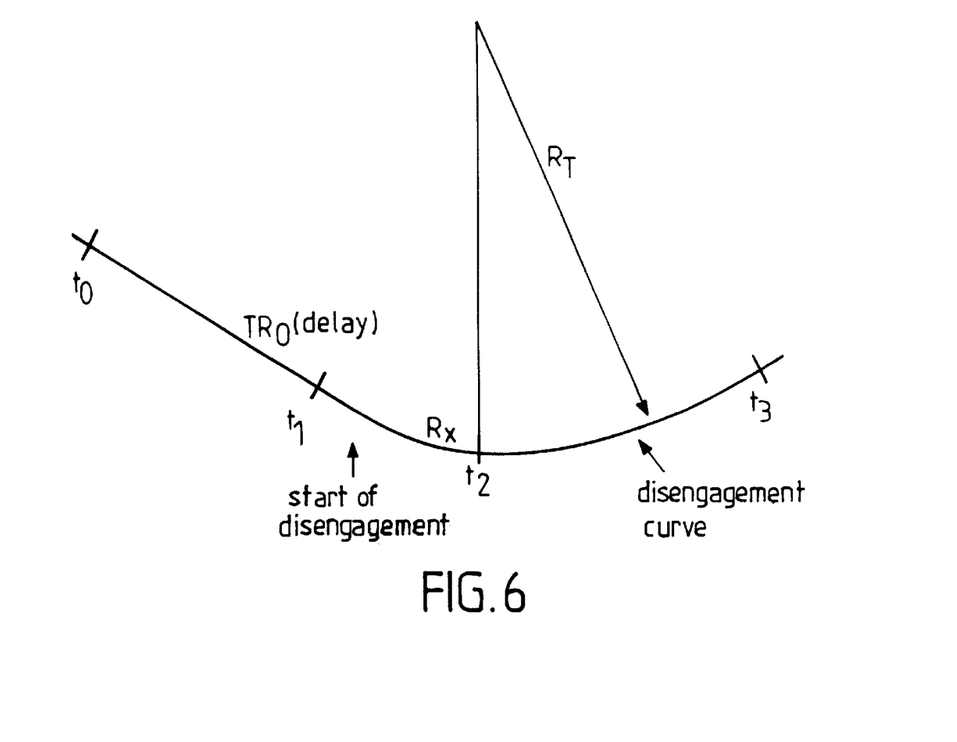
FIG. 6 (FIG. 21 of EP-A-0 565 399) is an example of a known avoidance path.

For this purpose, there are provided two surfaces (of curves in space) for protecting the aircraft in relation to the terrain, defined according to the same principle, but with different parameters and comprising (FIG. 5; FIG. 6 for one of these surfaces):

a short term surface CCT, mainly intended to avoid an accident. When a point of the terrain enters into the surface or upper envelope of the surface CCT, the pilot must intervene (alarm) by effecting an avoidance manoeuvre.

a medium term surface CMT, mainly intended to inform the pilot that the path of his aircraft will encounter an obstacle if it is continued as it is, and that he must envisage an avoidance manoeuvre (pre-alarm).

These surfaces which form an important element of the protection system, may be elaborated on the basis of numerous static and dynamic parameters of the aircraft, in particular:

the function of transferring the piloting of the aircraft, that is to say, its capacity to manoeuvre, the delays $TR_o$ due to the reaction time of the aircraft pilot, the horizontal speed $V_h$ of the aircraft, the rate of climb $V_z$ of the aircraft, the admissible load factor n.g, the safety height provided for, and the rate of roll of the aircraft.

For the rest of the description, some definitions are necessary:

"instantaneous axis" of the path of the aircraft designates in a predefined manner either the tangent to the instantaneous path (direction of the instantaneous velocity vector), or the axis of the past and predicted path of the aircraft (if the aircraft is in a turn, the axis is then curved), or yet again an axis (in principle an intermediate axis) defined, for example, by a linear-weighted combination of the two preceding axes;

"vertical plane" designates a surface (not necessarily planar) which contains the vertical passing through the aircraft and an instantaneous axis of the path of the aircraft; when the axis of the past and predicted axis is concerned, the "vertical plane" is a curved surface if the aircraft is in a turn; the manoeuvres whose main component is in a vertical plane are termed "vertical";

"horizontal plane" designates the horizontal plane passing through a reference point of the aircraft (the centre of gravity for example), and the manoeuvres, whose main component is in a horizontal plane, are termed "horizontal" or "lateral"; here too, the horizontal "plane" could be a surface curved in space defined according to the path of the aircraft;

amongst the horizontal manoeuvres, there is a distinction between those that go towards the left and those that go towards the right of the predicted path of the aircraft;

finally, the words "vertical" as well as "horizontal" or "lateral" will also be used for describing in particular the obstacles and hazards which may be encountered during the manoeuvres.

The avoidance limit curve in the vertical plane will be defined by three sections (FIGS. 6 and 8A):

from $T_{p0}$ to $T_1$, the continuation of the path such as it is during a time equal to the delay $RTO=T_1-T_0$ (corresponding to a reaction time), from $T_1$ to $T_2$ a transition period (SVRM1 in FIG. 8A) due to a possible decrease in the rolling and to a change in the radius of curvature of the path passing from infinity to the climbing radius RT, from $T_2$ to $T_3$, the avoidance path proper (SVRM2 in FIG. 8A) whose radius of curvature RT is a direct function of the square of the linear velocity of the aircraft, divided by the load factor actually applied, that is to say, $$R_T=(V_h)^2/n.g$$

The preceding indication has, in essence, been stated in FIG. 6 of EP-A-0 565 399.

Figure 8A:
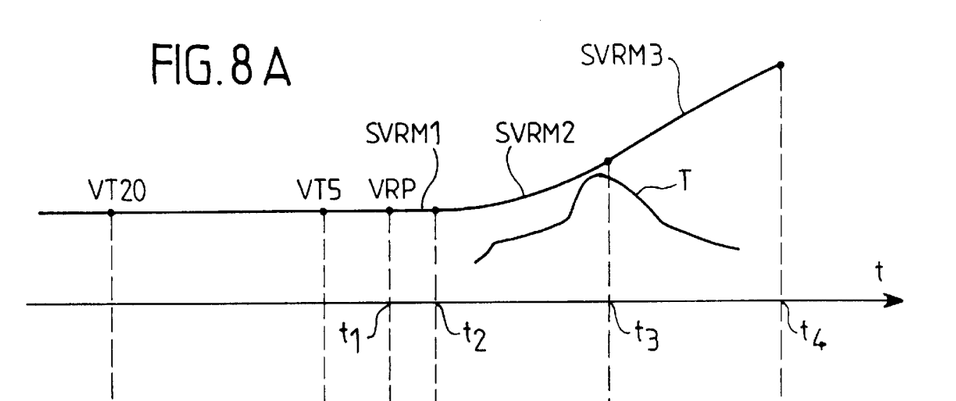
FIGS. 8A and 8B illustrate more completely an avoidance manoeuvre in the vertical plane.

With reference to FIG. 6, it is desirable (FIG. 8A) to add to the limit curve a fourth section:

beyond $T_3$, a straight sloping line SVRM3 linked to the characteristics (performances) of the aircraft.

Figure 8B:
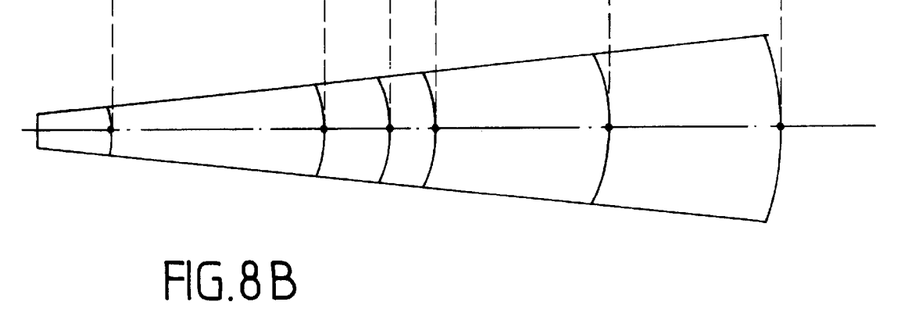

FIG. 8B (seen from above) shows that in practice, the avoidance limit curve is a surface in space. Thus the limits VT20, VT5 and VRP of FIG. 8A become curvilinear segments, here defined in the horizontal planes passing through the points VT20, VT5 and VRP, such as illustrated in FIG. 8A.

FIGS. 8A and 8B take up again the elements of FIG. 6, while adding thereto, in a processing operation of a different kind:

a path is first of all defined which corresponds to a standard avoidance manoeuvre in the vertical plane, known as SVRM (Standard vertical recovery manoeuvre);

by taking the instantaneous axis of the path of the aircraft and/or along the orientation of the predicted path (or their linear combinations), one can cause the SVRM to slide on this axis up to the point where it encounters the envelope of the terrain;

a time or vertical reference point VRP can then be defined which is the start of the SVRM;

ahead of this point VRP on the predicted path, two instants VT5 and VT20 are defined, with, for example, VT5=VRP−5 seconds, and VT20=VRP−20 seconds;

a "vertical" pre-alarm and alarm are then defined, respectively when the aircraft passes the point VT20 and when it passes the point VT5 (the alarm of course "squashes" the pre-alarm).

The difference in processing is due to the fact that, as shown in FIG. 8A, the avoidance manoeuvre is defined in relation to the terrain T, rather than in relation to the position of the aircraft at the time.

The technical means defined above give satisfaction for the greater part of the situations encountered in practice.

In short, they make it possible to provide the pilot(s) of the aircraft with an alarm signal to "pull up" if the predicted path allows a definite hazard to be assumed in relation to the adjoining terrain flown over, so that the pilot can as a matter of urgency initiate a manoeuvre for avoiding this terrain with a minimum safety margin. The notion of the minimum safety margin refers both to the pilot's reaction time and the distance from the avoided terrain. The expression "adjoining terrain flown over" takes into account not only the terrain directly encountered in the axis of the path of the aircraft, but also the parts of terrain adjoining it.

Associated with this alarm signal is a preliminary signal (termed "alert") which intervenes a few seconds earlier, so as to inform the crew of the proximity of this potential hazard.

However, there are cases where it is normal for the aircraft to pass beyond the last point for undertaking the standard avoidance manoeuvre. Now, beyond this point, no "vertical" avoidance manoeuvre is any longer possible.

These cases correspond in particular to paths which must be followed in a fairly precipitous mountainous environment. These paths are at first directed towards the relief which rises far higher than the actual altitude of the aircraft. Consequently, once the last VRP point has been passed, the aircraft can no longer cross this relief with certainty by a manoeuvre in the vertical plane along the axis of the predicted path. The path is continued by changes in orientation of the aircraft. These are encountered in particular in the course of approaches to airports surrounded by mountains forming boxed-in valleys.

It might be thought that since this problem has already been encountered with military aircraft, it is easy to transpose the means used by the military to apply them to anti-collision devices for civilian aircraft. Practice has shown that this transposition is far from being directly available for many reasons, one of them being the fact that high accelerations are at the same time distinctly less acceptable to the aircraft and very quickly intolerable, and even injurious, for the passengers.

It is also possible to define a standard horizontal avoidance manoeuvre (SHRM) for civilian aircraft which is capable of being initiated as a matter of urgency to avoid a hazard of collision with the surrounding terrain with minimum safety margins (in terms of the reaction time and the lateral distances MH and height MV in relation to the avoided terrain).

A particular example will first be described with reference to FIGS. 9A to 9D.

The avoidance path SHRM proper starts at a point HRP situated on the predicted path. Ahead of this point, are provided two anticipated points HT5 and HT20 also situated on the predicted path, respectively for example 5 and for example 20 seconds, ahead of the point HRP, taking into account the speed of the aircraft at the time.

The case where the aircraft is in a horizontal flight (FIGS. 9A and 9B) will first of all be considered:
the first segment SHRM1 (from $t_1$ to $t_2$) lies in making an accentuated turn, with, for example, a turning radius RR of the order of 4 km (2 nautical miles), compatible with the performances of the aircraft,
the second segment SHRM2 (from $t_2$ to $t_3$) lies in continuing the accentuated turn so as to come back towards the point HRP,
a third segment SHRM3 (from $t_3$ to $t_4$) may lie in a reiteration of the first two segments (without undertaking a turn) so as to come back towards the point HRP, with a gain in altitude, if required.

Figure 9A:
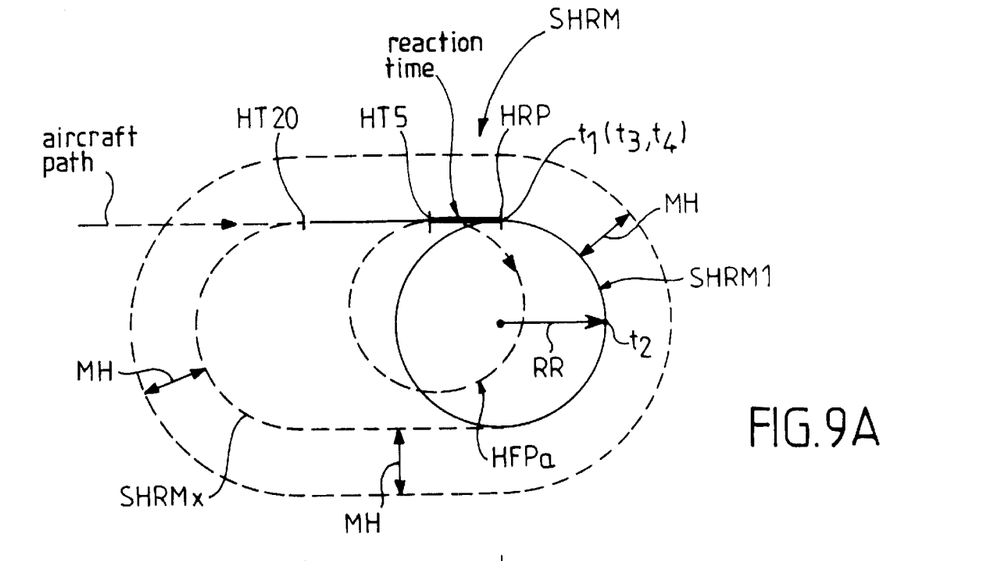
FIGS. 9A to 9D illustrate an avoidance manoeuvre in a turn in different situations.
Figure 9B:
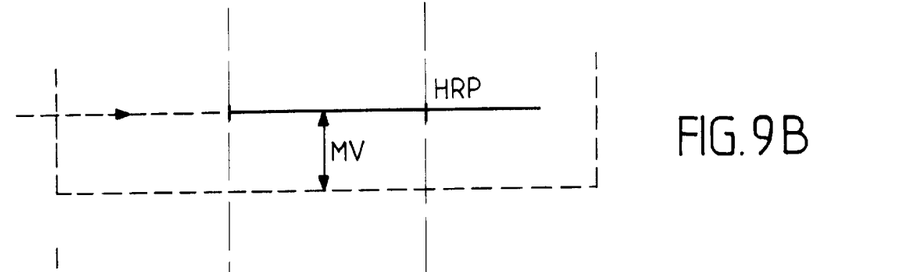
Figure 9C:
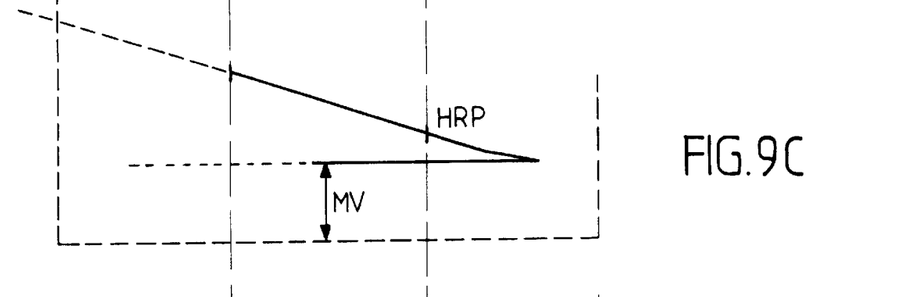

An actual path of the aircraft can be HFPa (dashed lines), because the pilot has available for making a turn a margin of manoeuvre that is even more accentuated than that of the SHRM.

A path SHRMx is represented in a dashed median line, which is the limit of the path SHRM obtained on the assumption of an instantaneous reaction time of the pilot (as from passing beyond the point HT20).

A constraint is set up, according to which all the path comprised between SHRM and SHRMx must remain at a minimum horizontal distance MH from the reliefs, and at a vertical distance MV from the reliefs. MH may be chosen of the order of, for example, 1 kilometre (0.5 nautical miles). MH may be chosen of the order of, for example, 150 meters (450 feet).

In the case of FIGS. 9A and 9B, this amounts to considering all the points of the domain (plane or curve) comprised between SHRM and SHRMx, to apply to them the distance conditions concerning MH and MV. This may be readily undertaken by checking that no relief passes beyond the corresponding planar domain on the basis of the local map obtained from the on-board terrain file, whose accuracy is, as a matter of principle, increased at the approaches of airports and of zones of approach paths in a precipitous environment.

In the case where the aircraft is descending, (FIG. 9C) or climbing (FIG. 9D), the stage SHRM1 is modified, to allow it to regain a horizontal flight condition. It may thereby be prolonged in time.

Figure 9D:
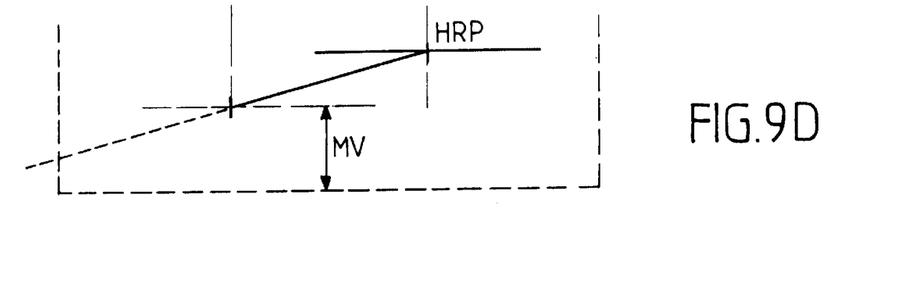

In all cases, the constraints of lateral distance and height apply to the whole set of the domain SHRMx+SHRM; consequently, in the case of climbing, the vertical distance constraint applies as from the point HT20 (FIG. 9D).

If the aircraft is in a turn, the predicted path takes into account the initial situation of the aircraft.

More generally, the manoeuvre SHRM is defined as being a path which:
is broken down into:
a continuation of the path at the time, taking into account the initial situation (speed, rolling, flight path gradient, during an initial reaction time which leads to a point HRP,
making a turn as from a reference point HRP at the instant designated $t_1$ in FIG. 9A, with a bank exceeding 20° (with a rolling rate of 15° /s for example),
in the case of a descending flight, with a cancellation of the vertical speed during a period $t_2$ (FIG. 9A), for example the first 90 degrees of the turn, so as to keep the aircraft in level flight;
a continuation of the turning flight so as to make a complete circle (or even several),
in the case of a horizontal or a climbing flight at an altitude at least equal to the altitude at the time,
in the case of a descending flight at an altitude at least equal to the altitude at the time, reduced by the loss in height necessary for assuming level flight;
makes it possible to avoid the surrounding terrain for the purpose of:
a vertical margin (MV) at least equal to a predefined value (for example 450 feet) in relation to the horizontal portion of this path (in the most unfavourable case)
a horizontal margin (MH) at least equal to a predefined value (for example 0.5 NM) in relation to the path.
These margins must take into account the initial reaction time.

is compatible with the capabilities of the aircraft at the start of the manoeuvre, requires an angle of bank which is, as a matter of principle, more severe than that which would be used for a standard turn undertaken in the absence of a collision hazard, permits a preliminary reaction time for initializing this manoeuvre before a reference point HRP.

It should be noted that:

HRP is viewed as the last point from which the turn must be made the object of this manoeuvre is to allow an aircraft to return to its present point deemed to be "safe" and to be able to circle while climbing (if it is considered to be worthwhile) to get out of this potentially dangerous situation.

The path described corresponds to the last path to undertake a horizontal avoidance manoeuvre.

Consequently, it must permit a pilot to be capable of undertaking a horizontal avoidance manoeuvre which normally will be tighter than the SHRM (thus with a tighter turn) and include the making of a turn before the point HRP.

As with the vertical, the processing is "reversed", that is to say, that one determines at first what will be the limiting set SHRM (and SHRMx) which corresponds to the constraints of the lateral and vertical distances in relation to the relief of the local map.

This is done by extrapolating the path at the time, and for a range of paths adjoining the path at the time, in the same way as illustrated in FIG. 8B for the SVRM.

On this basis, one knows how to determine the points HT20 and HT5.

In fact, generally two respective different possibilities will be available, to the right (r) and the left (l) of the aircraft path at the time. Two points HRPr and HRP, follow from this. Where it is not necessary to distinguish right and left, one of the sides will be called (i) and the other (j). The corresponding notations are $HRP_i$ and $HRP_j$.

Figure 1:
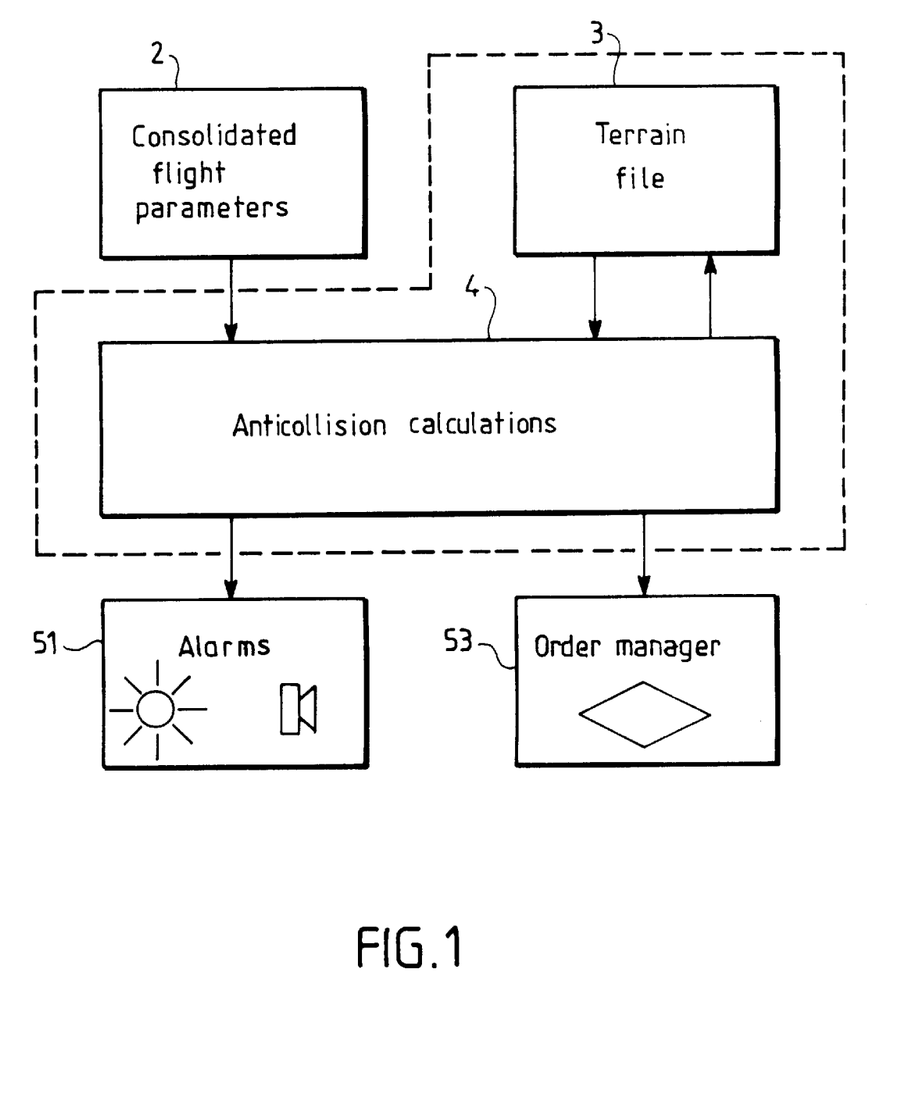
FIG. 1 is a very general flow chart of the prior art device, described in EP-A-0 565 399.
Figure 2:
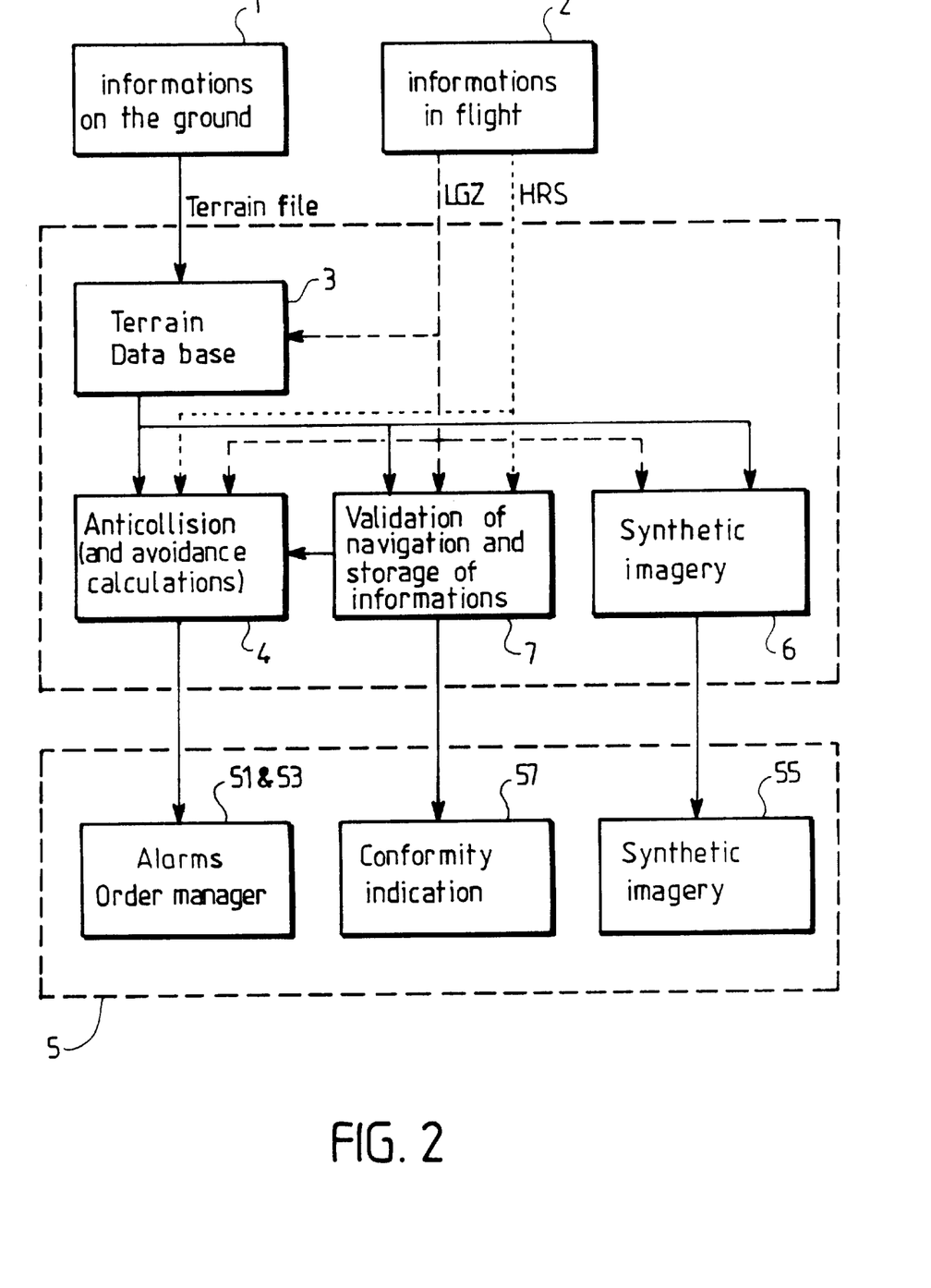
FIG. 2 is a more detailed flow chart of the same prior art device.
Figure 7:
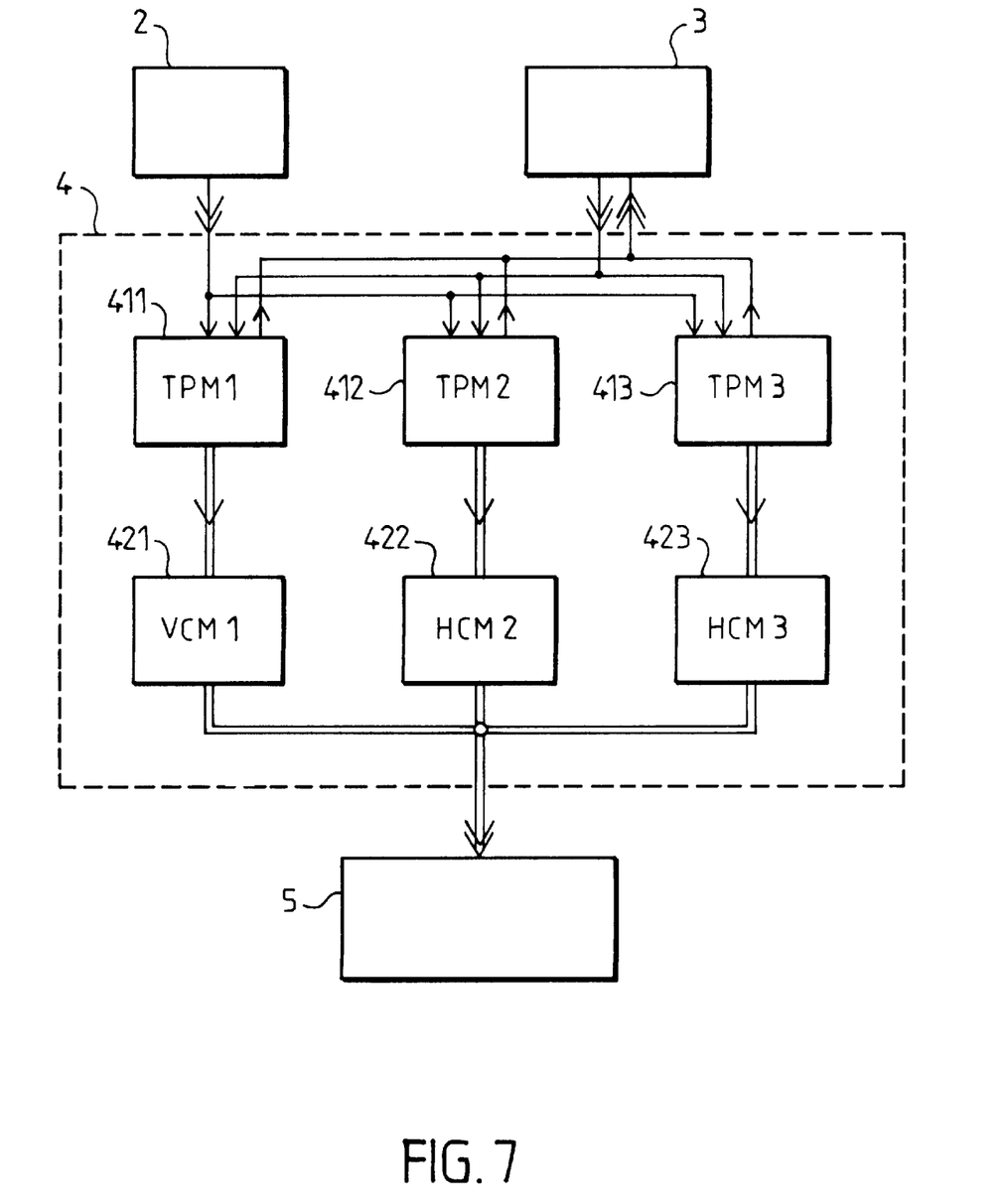
FIG. 7 is a very general flow chart of a device according to the present invention.

For operating these functions, the present invention provides means that are illustrated in FIG. 7 in a way which is comparable to FIG. 1. The unit 4 is now subdivided into three lines which comprise:

first path prediction means TPM1 bearing the reference numeral 411, followed by first comparison means in the vertical plane VCM1 bearing the reference numeral 421;

second path prediction means TPM2 bearing the reference numeral 412, followed by second comparison means operating laterally on one side of the vertical plane HCM2, designated 422; and third path prediction means TPM3 bearing the reference numeral 413, followed by third comparison means HCM3 designated 423, operating laterally on the other side of the vertical plane.

On this basis, the alarm decision unit 5 operates in a way that will now be described.

The actual instant of the current path of the aircraft will be designated by t. To determine whether the aircraft has passed beyond the point VT20 of FIG. 8, it is therefore necessary to determine the sign (polarity) of the expression: t−VT20. It is specified that notations such as VT20 designate both the instant scheduled at point VT20 ahead of the reference point which here is VRP, and the point of the path which corresponds to this time interval. The expression (t−VT20) is positive if the point VT20 has been passed, but is negative in the opposite case.

Figure 10:
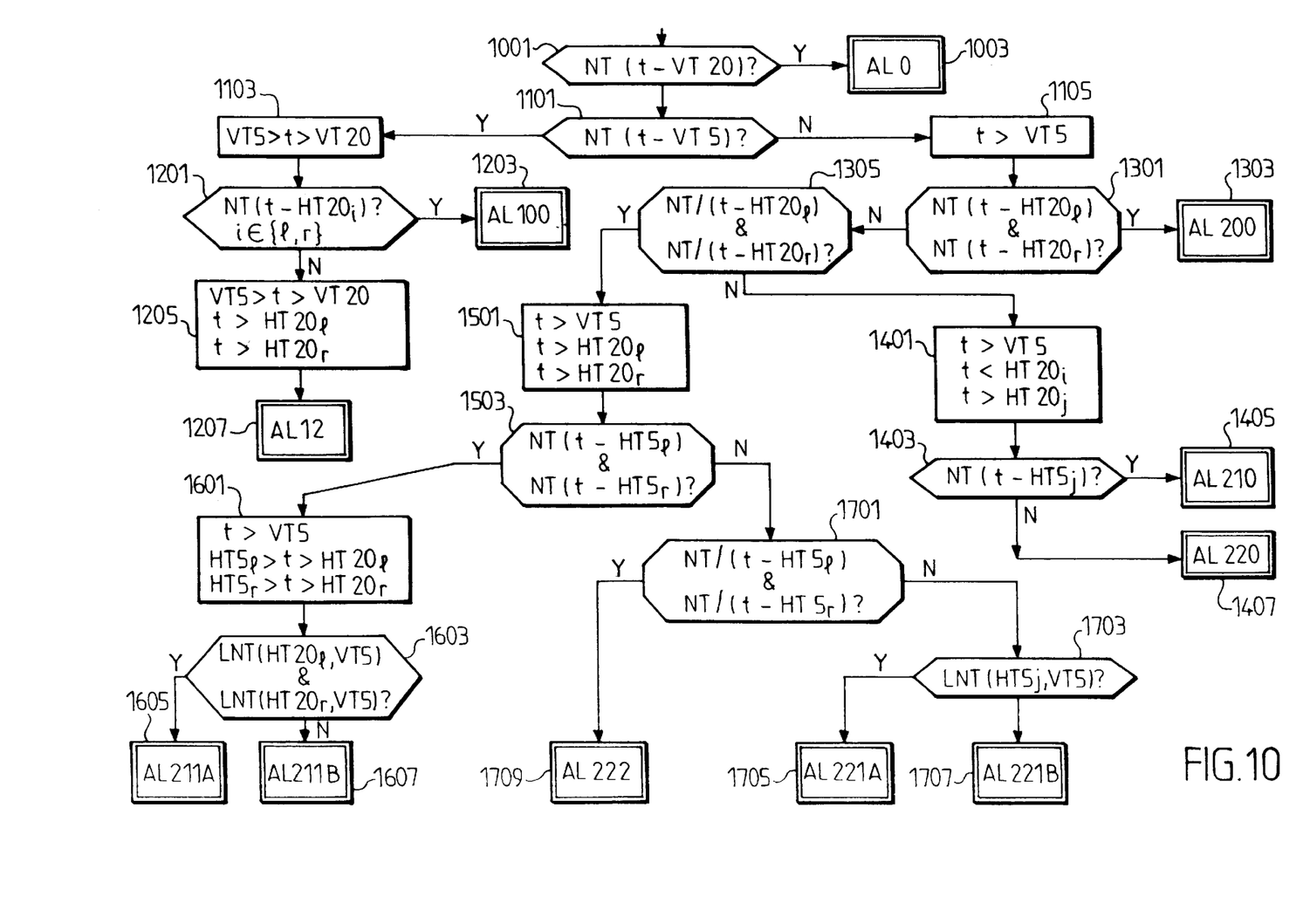
FIG. 10 is a flow chart defining anti-collision avoidance manoeuvres in accordance with the present invention.

To prevent cluttering of the drawing of FIG. 10, representing the decision-making mechanism used in the example described, recourse is made to several functions relating to expressions of this kind.

The result of the logic function "No Negative Transition", designated NT/( ), is, for a digital argument "Arg":

YES (True), if the last passing through zero of Arg is towards positive values, or if Arg has always remained positive (from an adequate time from inception);

NO (False), if the last passing through zero of Arg is towards negative values, or if Arg has always remained negative (for an adequate time from inception).

The time of inception may be the start of the flight, from which it is then preferable to deduct the take-off proper, taxying to the runway and just afterwards, by means of criteria such as non-contact of the landing gear with the ground, or the act of raising the landing gear, or passing to a height of 15 m above the runway threshold, for example.

The function NT( ) is the opposite logic to the preceding one, that is to say, the function NT( ) is false if NT/( ) is true and vice versa. It is only used to simplify the writing of the conditions of FIG. 10.

In certain parts of the mechanism of FIG. 10, it is necessary to know which is the more recent of two events. One event will be the transition towards the positive values (with the definition given above) of an expression in the form of (t−VT20).

FIG. 10 uses for this purpose, and only for the purpose of illustration, a function LNT( ) that checks out that which is the last event encountered out of several events. For example, the function LNT(HT20,VT5) replies "yes" if the last event encountered is the passing to positive values of the expression (t−VT5), and "no" if the last event encountered is the passing to positive values of the expression (t−HT20).

To undertake this test, one way of doing it lies in dating all the transitions encountered over a recent period of the flight of the aircraft up to an appropriate temporal accuracy level. This may, moreover, be an arrangement of a function such as NT( ), which gives in this case the first logic result defined above, and, moreover, as a second result, the instant at which the last positive transition has been observed and, for example, the inception time without any transition.

On this basis, the function LNT( ) is a simple comparison of the times of two events.

Other procedures may be envisaged, such as for example, to provide a flag which would remain true (yes) as long as the most recent event is, in the example LNT(HT20,VT5) the passing of (t−VT5), to a positive value.

Reference will now be made to FIG. 10. The first test 1001 determines whether one has not so far encountered any passing of the point VT20, that is to say, any positive transition of the expression (t−VT20). If yes, the status obtained at 1003 is the status ALO, from which it will be seen that it represents the absence of an alarm.

In the opposite case (no), one passes to test 1101, which determines whether the point VT5 has been passed, that is to say, whether the aircraft is or is not in the presence of a "vertical hazard". At the "yes" output of test 1101, the situation is that of a preliminary hazard, as illustrated in block 1103. In this case, the test 1201 aims to determine whether one has crossed the lateral pre-hazard point $HT20_i$ on each of the left and right sides of the aircraft. The index i denotes the side concerned, it being possible for i to assume one of the values left "l", or right "r". If at least one of the points $HT20_i$ has not been crossed, one passes to status 1203 or AL100 (it will be seen that it can be associated with the same message as the status AL0 of absence of an alarm).

In the opposite case, the situation (block 1205) comprises one vertical pre-hazard and two lateral pre-hazards (or hazards). A corresponding alarm AL12 is then emitted at 1207.

We now return to the test 1101. Its other output "no", as indicated at 1105, supposes that a vertical hazard is encountered, that is to say, that the point VT5 has been crossed. In this case, the test 1301 determines whether any positive transition has not yet been observed at the lateral points HT20 on one side (l) and the other side (r) of the vertical plane of the flight of the aircraft. If there is no lateral pre-hazard, one takes at 1303 the status AL200, which can be the same as the status AL0.

In the opposite case, one passes to test 1305. (The function is NT/( ) and not NT( ) in this test 1305). It investigates whether the point HT20 has been crossed on both sides "l" and "r". Taking into account the test 1301, the "no" response of the test 1305 signifies that a lateral pre-hazard (perhaps a lateral hazard) has been encountered on one, and only on one of the sides of the vertical plane, as indicated in the statue block 1401. This side is designated by the index j, it being possible for j to assume one of the values, (l) for the left and (r) for the right.

The test 1403 then determines whether a lateral hazard has been encountered on the side j considered, by means of the expression $NT/(t-HT5_j)$. The "yes" output indicates that one is in a lateral pre-hazard situation on one side only, and the alarm indicated is then AL210 (block 1405), with messages to which we will revert below. In the opposite case, one is concerned with a lateral hazard on one side only, which produces the status AL220 at 1407.

We will now revert to the other output (yes) of the test 1305. In this case (block 1501), the situation is that of a vertical hazard and of pre-hazards (which may be hazards) on both sides.

The test 1503 determines whether the two functions $NT(t-HT5_l)$ and $NT(t-HT5_r)$ reply "yes" that is to say, whether one remains at the level of a pre-hazard on both sides. If yes, this concerns only a vertical hazard and a pre-hazard on both sides (status block 1601). In this case, the test 1603 determines whether the most recent transition encountered has been that relating to the vertical plane, that is to say, the vertical hazard. If yes, then an alarm AL211A is generated at the block 1605. In the opposite case, an alarm AL211B is generated at block 1607.

At the other output of the test 1503 ("no"), one has proceeded as far as the lateral hazard, at least on one side of the vertical plane. The test 1701 determines whether one has proceeded as far as the lateral hazard on both sides of the vertical plane of the aircraft. If this condition has not been verified, that is to say, that there is a pre-hazard on one side and a hazard on the other side (designated j), one determines in test 1703 whether the last event encountered has been that of the vertical hazard, that is to say, that relating to the vertical hazard. If yes, the alarm AL221A is produced at the unit 1705. If not, it is the alarm AL221B of the unit 1707 that is generated.

Finally, for the other output of the test 1701, there is a vertical hazard together with a hazard on both sides, and the alarm, which corresponds in the case in practice to the maximum hazard, is designated by AL222 in block 1709.

FIG. 10 has thus made it possible to describe the general transition mechan-ism of various situations; no hazard, pre-hazard, hazard, and this for the vertical, lateral left, lateral right.

The messages addressed to the pilot are amenable to various general options. We will now describe preferred examples of the options with reference to Table I attached at the end of the present description.

In the first column, Table I takes up the symbols of the alarms in FIG. 10. The following three columns recall corresponding statuses, (i) in the axis, (ii) on the side with the maximum hazard, and (iii) on the other side, respectively. In the fifth column, there appear the messages provided according to the prior art.

The last three columns respectively define the options 1, 2 and 3 for the messages displayed to the pilot in one example of operating the invention. These messages are in English, as is customary in civilian aviation. A French translation thereof is here provided:

| ENGLISH | FRENCH |
| --- | --- |
| Caution terrain (ahead) | Alert terrain (devant) |
| Pull Up | Monter |
| Avoid terrain | Evitement terrain |

The "absence of alarm" statuses AL0, AL100 and AL200 of course do not give rise to any message.

The status AL12 corresponds to a vertical pre-hazard with a hazard on at least one side. In this case, the three options provide for a message to be sent to the pilot advising him of a hazard [of collision] with the terrain.

The status AL210 is that of a vertical hazard with a pre-hazard on one side, which also does not give rise to any message in the options 1 and 2. Option 3 provides for the pilot to be informed of a vertical pre-hazard by the alarm indicated.

The status AL220 is that of a vertical hazard with a hazard on one side but without even a pre-hazard on the other side. In the three options, the message sent informs the pilot of the vertical hazard.

The statuses AL211A and AL211B are those of a vertical hazard with a pre-hazard on both sides. Option 2 makes no distinction, and the message of a vertical pre-hazard will be seen in the two cases. On the other hand, options 1 and 3 make a distinction according as to whether the most recent transition has occurred at the level of the vertical hazard, in which case a message is sent to the pilot inviting him to pull up; in the opposite case, where the most recent event is the pre-hazard on both sides, a message is sent to the pilot inviting him to execute a lateral avoidance action. ("avoid terrain").

The statuses AL221A and AL221B have in common the fact that they concern a vertical hazard, with a hazard on one side and a pre-hazard on the other side. In the two cases, options 2 and 3 provide for a vertical pre-hazard message ("caution terrain ahead") to be addressed to the pilot. According to option 1, an urgent invitation is delivered to the pilot so as:

in the status AL221A, to take vertical avoidance action, or
in the status AL221B, to take lateral avoidance action.

Finally, the last status AL222 is that of a vertical hazard with a hazard on both sides. In this case, option 1 invites the pilot to pull up as a matter of urgency. Options 2 and 3 invite him to take a lateral avoidance action as a matter of urgency.

In the preceding discussion, the expression "lateral avoidance action" concerns the possibility of circling while climbing to gain height, so as to escape from dangerous reliefs situated in the axis of the predicted path in the way indicated above.

The choice between the various options is taken beforehand and will depend in particular on the following considerations:

manoeuvring capabilities of the aircraft, definition of the main parameters of the anti-collision system, and in particular of the effective values of the times VT5, VT20, as well as HT5 and HT20. In passing, it should be noted that the times are not necessarily the same on the two sides of the aircraft, although it is largely considered that it is preferable for these times to be identical, a predefinition at the start of the flight(s), taking into account particular cases that may be encountered by the aircraft, in particular on approaching its home airport or destination airports, or intermediate points of call. Of course, neither the alarm messages, nor the conditions for applying them, such as defined with reference to FIG. 10 and Table I are restrictive. The alarms may be set up in detail or completed in a more general manner, for example, as already described according to the considerations regarding the most recent of the events encountered, or of several of the most recent events encountered, or regarding other conditions applicable to these events.

For example, at the status AL220, a vertical hazard "pull up" alarm may be emitted instead of the pre-alarm "caution terrain ahead". In other cases, it is possible to use the messages provided in the prior art, but after having taken into consideration the additional conditions added in accordance with the present invention.

The alarm messages themselves are not restrictive.

In the examples given in Table I, the messages inviting a lateral avoidance do not indicate to which side the pilot must proceed. It is, of course, conceivable to inform him more completely by indicating to him, in particular, that the avoidance action is impossible on the left ("left side terrain unclear"), or at the right (right side terrain unclear"), for example by breaking down the status AL100.

Moreover, it may also be envisaged to add a "pre-pre-hazard level" given to the pilot by way of information ("advisory").

I claim:

1. A device for aiding air navigation and air safety of an airplane, said device comprising:

an input for receiving status indications, capable of permitting a prediction of the path of the aircraft;

a working memory capable of containing a local altimetric map from which an altitude envelope of the terrain can be defined in the vicinity of the aircraft;

first path prediction means so as to establish a vertical limit path of the aircraft, on the basis of said status indications and selected flight parameters, in the vertical surface containing the axis of its path;

first comparison means for effecting a first comparison between this vertical limit path and the corresponding part of the altitude envelope, so as to determine a hazard of a vertical collision with the ground;

alarm means to establish at least one alarm status according to the result of the first comparison;

second prediction means for establishing, on the basis of said status indications and selected flight parameters, a lateral limit path for the aircraft on one side of the vertical of the flight path, and second comparison means for effecting a second comparison between this lateral limit path and the corresponding part of the altitude envelope;

and wherein said alarm means are operative so as to modify said at least one alarm status relating to the first comparison, if the second comparison means do not indicate any collision hazard with the ground.

2. A device for aiding air navigation and air safety of an airplane, said device comprising:

an input for receiving status indications, capable of permitting a prediction of the path of the aircraft;

a working memory capable of containing a local altimetric map from which an altitude envelope of the terrain can be defined in the vicinity of the aircraft;

first path prediction means so as to establish a vertical limit path of the aircraft, on the basis of said status indications and selected flight parameters, in the vertical surface containing the axis of its path;

TABLE I

| SYMB | VERTICAL | SIDE 1 | SIDE 2 | PRIOR ART | OPTION 1 | OPTION 2 | OPTION 3 |
|---|---|---|---|---|---|---|---|
| AL0 | — | | — | — | — | — | — |
| AL100 | Prehazard | | — | "Caution terrain ahead" | — | — | — |
| AL12 | Prehazard | Prehazard or hazard | Prehazard or hazard | "Caution terrain ahead" | "Caution terrain" | "Caution terrain" | "Caution terrain" |
| AL200 | Hazard | — | — | "Pull Up" | — | — | — |
| AL210 | Hazard | Prehazard | — | "Pull up" | — | — | "Caution terrain ahead" |
| AL220 | Hazard | Hazard | — | "Pull up" | "Caution terrain ahead" | "Caution terrain ahead" | "Caution terrain ahead" |
| AL211A | Hazard + récent | Prehazard | Prehazard | "Pull up" | "Pull up" | "Caution terrain ahead" | "Pull up" |
| AL211B | Hazard − récent | Prehazard | Prehazard | "Pull up" | "Avoid terrain" | "Caution terrain ahead" | "Avoid terrain" |
| AL221A | Hazard + récent | Hazard | Prehazard | "Pull up" | "Pull up" | "Caution terrain ahead" | "Caution terrain ahead" |
| AL221B | Hazard − récent | Hazard | Prehazard | "Pull up" | "Avoid terrain" | "Caution terrain ahead" | "Caution terrain ahead" |
| AL222 | Hazard | Hazard | Hazard | "Pull up" | "Pull up" | "Avoid terrain" | "Avoid terrain" | first comparison means for effecting a first comparison between this vertical limit path and the corresponding part of the altitude envelope, so as to determine a hazard of a vertical collision with the ground;

alarm means to establish at least one alarm status according to the result of the first comparison;

second prediction means for establishing, on the basis of said status indications and selected flight parameters, a lateral limit path for the aircraft on one side of the vertical of the flight path, and second comparison means for effecting a second comparison between this lateral limit path and the corresponding part of the altitude envelope;

wherein said alarm means are operative so as to modify said at least one alarm status relating to the first comparison, if the second comparison means do not indicate any collision hazard with the ground wherein said lateral limit path corresponds to a turn of 360° to return towards the same starting point of the turn, without loss of height other than that necessary for starting a horizontal flight if required.

3. A device according to claim 1, further comprising:

third prediction means to establish on the basis of said status indications and selected flight parameters another lateral limit path for the aircraft on the other side of the vertical, and third comparison means to effect a third comparison between this other lateral limit path and the corresponding part of the altitude envelope;

and wherein said alarm means are operative so as to modify or inhibit said at least one alarm status relating to the first comparison which indicates a maximum hazard, at least in the case where the second and the third comparison means do not at one and the same time indicate any hazard of a lateral collision with the ground.

4. A device according to claim 2, wherein the alarm means are operative so as to modify or inhibit that one of the alarms relating to the first comparison which indicates a maximum hazard, if the second comparison does not indicate a hazard of a lateral collision with the ground.

5. A device according to claim 3, wherein said first prediction means are operative so as to establish two vertical limit paths, for the medium term and short term respectively;

wherein said first comparison means are operative to operate two first comparisons between these two vertical limit paths and the parts corresponding to the altitude envelope, so as to determine a pre-hazard of a vertical collision with the ground, and a hazard of a vertical collision with the ground respectively;

wherein said alarm means are operative to emit a vertical pre-alarm and a vertical alarm respectively, according to said pre-hazard and said hazard; and wherein said alarm means are operative so as to modify or inhibit the vertical pre-alarm, at least in the case where the second and third comparison means do not at one and the same time indicate a hazard of a lateral collision with the ground.

6. A device according to claim 5, wherein said alarm means are operative to modify or inhibit the vertical pre-alarm, if one of the second and third comparison means does not indicate a hazard of a lateral collision with the ground.

7. A device according to claim 5, wherein said alarm means are operative to modify or inhibit the vertical alarm if the second and third comparison means do not at one and the same time indicate a hazard of a lateral collision with the ground.

8. A device for aiding air navigation and air safety of an airplane, said device comprising:

an input for receiving status indications, capable of permitting a prediction of the path of the aircraft;

a working memory capable of containing a local altimetric map from which an altitude envelope of the terrain can be defined in the vicinity of the aircraft;

first path prediction means so as to establish a vertical limit path of the aircraft, on the basis of said status indications and selected flight parameters, in the vertical surface containing the axis of its path;

first comparison means for effecting a first comparison between this vertical limit path and the corresponding part of the altitude envelope, so as to determine a hazard of a vertical collision with the ground;

alarm means to establish at least one alarm status according to the result of the first comparison;

second prediction means for establishing, on the basis of said status indications and selected flight parameters, a lateral limit path for the aircraft on one side of the vertical of the flight path, second comparison means for effecting a second comparison between this lateral limit path and the corresponding part of the altitude envelope;

third prediction means to establish on the basis of said status indications and selected flight parameters another lateral limit path for the aircraft on the other side of the vertical, third comparison means to effect a third comparison between this other lateral limit path and the corresponding part of the altitude envelope;

and wherein said alarm means are operative so as to modify or inhibit said at least one alarm status relating to the first comparison which indicates a maximum hazard, at least in the case where the second and the third comparison means do not at one and the same time indicate any hazard of a lateral collision with the ground;

wherein said first prediction means are operative so as to establish two vertical limit paths, for the medium term and short term respectively;

wherein said first comparison means are operative to operate two first comparisons between these two vertical limit paths and the parts corresponding to the altitude envelope, so as to determine a pre-hazard of a vertical collision with the ground, and a hazard of a vertical collision with the ground, respectively, wherein said alarm means are operative to emit a vertical pre-alarm and a vertical alarm, respectively, according to said pre-hazard and said hazard; and wherein said alarm means are operative so as to modify or inhibit the vertical pre-alarm, at least in the case where the second and third comparison means do not at one and the same time indicate a hazard of a lateral collision with the ground wherein said second and third prediction means are operative so as to each establish two lateral limit paths for the medium and short term, respectively, and on either side of the vertical, respectively;

wherein said second comparison means are operative to operate two second comparisons between the medium and short term limit paths coming from the second prediction means, and the corresponding parts of the altitude envelope, so as to determine on one side of the vertical, a pre-hazard of a lateral collision with the ground, and a hazard of a lateral collision with the grounds respectively; wherein said third comparison means are arranged to as to operate two third comparisons between the medium and short term lateral limit paths coming from the third prediction means, and the corresponding parts of the altitude envelope, so as to determine on the other side of the vertical, a pre-hazard of a lateral collision with the ground, and a hazard of a lateral collision with the ground, respectively;

and wherein said alarm means are operative to take the fact that the second and third comparison means do not indicate any pre-hazard of a lateral collision with the ground as the condition for the absence of a lateral ground collision hazard.

9. A device according to claim 8, wherein said alarm means are operative to emit a vertical pre-alarm in the case where there is both a pre-hazard of a vertical collision with the ground and a pre-hazard of a lateral collision with the ground on one side.

10. A device according to claim 8, wherein said alarm means are operative so as not to emit any alarm in the case of an absence of a pre-hazard of a lateral collision with the ground on both sides.

11. A device according to claim 8, wherein said alarm means are operative so as not to emit any alarm in the case of a hazard of a vertical collision with the ground, but in the absence of a pre-hazard of a lateral collision with the ground on both sides.

12. A device according to claim 8, wherein said alarm means are operative so as not to emit any alarm in the case of a hazard of a vertical collision with the ground, provided that a pre-hazard of a lateral collision with the ground exists only on one side.

13. A device according to claim 8, wherein said alarm means are operative to emit a vertical pre-alarm in the case of a hazard of a vertical collision with the ground, provided that a pre-hazard of a lateral collision with the ground exists only on one side.

14. A device according to claim 8, wherein said alarm means are operative to emit a vertical pre-alarm in the case of a hazard of a vertical collision with the ground, provided that a hazard of a lateral collision with the ground exists on only one side.

15. A device according to claim 8, wherein said alarm means are operative to emit a vertical pre-alarm in the case where there is a hazard of a vertical collision with the ground, with a pre-hazard of a lateral collision with the ground on both sides.

16. A device according to claim 8, wherein said alarm means are operative to emit in the case where there is a hazard of a vertical collision with the ground with a pre-hazard of a lateral collision with the ground on both sides, a vertical alarm if the more recent one is the hazard of the vertical collision with the ground, otherwise a lateral alarm.

17. A device according to claim 8, wherein said alarm means are operative to emit a vertical pre-alarm, in the case where there is a hazard of a vertical collision with the ground, with a pre-hazard of a lateral collision with the ground on one side, and with a hazard of a lateral collision with the ground on the other side.

18. A device according to claim 8, wherein said alarm means are operative so that, in the case where there is a hazard of a vertical collision with the ground, a pre-hazard of a lateral collision with the ground on one side, and a hazard of a lateral collision with the ground on the other side, it emits a vertical alarm, if the more recent is the hazard of a vertical collision with the ground, but otherwise it emits a lateral alarm.

19. A device according to claim 8, wherein said alarm means are operative to emit a vertical alarm, in the case where there is a hazard of a vertical collision with the ground as well as a hazard of a lateral collision with the ground on both sides.

20. A device according to claim 8, wherein said alarm means are operative to emit a lateral alarm in the case where there is hazard of a vertical collision with the ground, as well as a hazard of a lateral collision with the ground on both sides.

* * * * *